(12) United States Patent
Tamai et al.

(10) Patent No.: US 7,696,730 B2
(45) Date of Patent: Apr. 13, 2010

(54) CONTROL APPARATUS FOR AC-AC CONVERTER

(75) Inventors: Yasuhiro Tamai, Hino (JP); Tatsuya Yamada, Suzuka (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 308 days.

(21) Appl. No.: 11/882,283

(22) Filed: Jul. 31, 2007

(65) Prior Publication Data

US 2008/0055955 A1 Mar. 6, 2008

(30) Foreign Application Priority Data

Aug. 10, 2006 (JP) ............... 2006-217733

(51) Int. Cl.
*H02J 3/08* (2006.01)
*H02J 3/00* (2006.01)
(52) U.S. Cl. .................. 323/217; 323/219; 363/34
(58) Field of Classification Search ............ 363/34, 363/118, 164, 163, 148, 149; 323/237, 212, 323/216, 217, 241, 246, 271, 283, 285, 219; 318/606, 607, 608
See application file for complete search history.

(56) References Cited

U.S. PATENT DOCUMENTS 4,468,725 A * 8/1984 Venturini ............... 363/160
6,008,617 A * 12/1999 Kaneko et al. ............ 318/807
6,815,924 B1 * 11/2004 Iura et al. ............... 318/727
7,005,828 B2 * 2/2006 Karikomi ............... 318/801

FOREIGN PATENT DOCUMENTS

JP 05-260762 10/1993

OTHER PUBLICATIONS

Jun-Ichi Itoh et al., A Control Method for the Matrix Converter Based on Virtual AC/DC/AC Conversion Using Carrier Comparison Method, journal, 2004, 11 pages (with translation), vol. 124 No. 5, IEEJ, Japan, Specification p. 4.
Ikuya Sato et al., An Improvement Scheme of Motor Drive Performance for Matrix Converter, paper, 2004, 9 pages (with translation), SPC-04-75, IEEJ-Semiconductor Power Conversion Society, IEA-04-02, Specification p. 5.

* cited by examiner

*Primary Examiner*—Jessica Han
*Assistant Examiner*—Emily Pham
(74) *Attorney, Agent, or Firm*—Rabin & Berdo, P.C.

(57) ABSTRACT

A control apparatus for an AC-AC direct converter. The control apparatus includes a calculator providing a phase command $\theta^*$ of an output voltage of the converter, a calculator providing a q-axis current $i_q$ by using output currents $i_u$ and $i_w$ and the phase command $\theta^*$, a detector detecting a pulsation component contained in the q-axis current $i_q$, a calculator providing a phase correction magnitude $\theta_{cmp}$ so as to decrease the pulsation component, and an adder/subtractor correcting the phase command $\theta^*$ by using the correction magnitude $\theta_{cmp}$. This apparatus can decrease the output voltage distortion and low frequency torque pulsation and can suppress the increase of an output current without weakening a magnetic flux, even when the converter is operated in an overmodulation region.

19 Claims, 12 Drawing Sheets

CONTROL APPARATUS FOR AC-AC CONVERTER

BACKGROUND OF THE INVENTION

1. Field of the Invention

The invention relates to a control apparatus for an AC-AC direct converter in which a multiphase AC voltage is directly converted into a multiphase AC voltage of any desired amplitude and frequency by turning ON and OFF semiconductor switching elements.

2. Description of the Related Art

A matrix converter has been known as an AC-AC direct converter of the type specified above. Hereinbelow, the matrix converter will be taken as an example, and the configuration and operation of a control apparatus for the matrix converter will be explained.

First of all, FIG. 8 is a diagram showing the configuration of a main circuit of the matrix converter. Referring to FIG. 8, letters R, S and T denote AC input terminals that are connected to a three-phase power system or the like (also input phases of the power system shall be denoted by the same letters), and letters U, V and W denote AC output terminals to which a load is connected (also output phases of the matrix converter shall be denoted by the same letters). Bidirectional switches $S_{ru}$, $S_{su}$, $S_{tu}$, $S_{rv}$, $S_{sv}$, $S_{tv}$, $S_{rw}$, $S_{sw}$ and $S_{tw}$, each of which is capable of controlling a current bidirectionally, are connected between the input and output terminals. The matrix converter does not include an energy buffer of large capacity, and it directly derives an AC input voltage by ON/OFF controlling semiconductor switching elements which constitute the bidirectional switches $S_{ru}$, $S_{su}$, $S_{tu}$, $S_{rv}$, $S_{sv}$, $S_{tv}$, $S_{rw}$, $S_{sw}$ and $S_{tw}$, thereby to obtain an AC output voltage having any desired amplitude and frequency.

FIG. 9 is a block diagram of a control apparatus for the matrix converter. There are various conventional control schemes for the matrix converter. Among those conventional schemes, FIG. 9 shows an exemplary control scheme wherein the ON/OFF commands of the individual semiconductor switching elements constituting the matrix converter are created by supposing a system in which virtual rectifier 100 and virtual inverter 200 subjected to a PWM control are combined through virtual DC intermediate capacitor 300 as shown in FIG. 11. In FIG. 11, letters $S_{1r}$-$S_{6r}$ denote semiconductor switching elements that constitute the virtual rectifier 100, while letters $S_1$-$S_6$ denote semiconductor switching elements that constitute the virtual inverter 200.

Referring to FIG. 9, virtual rectifier command calculator 21 calculates input current command values $i_r^*$, $i_s^*$ and $i_t^*$ of the virtual rectifier 100, and virtual inverter command calculator 23 calculates output voltage command values $v_u^*$, $v_v^*$ and $v_w^*$ of the virtual inverter 200. Both the input current command values and the output voltage command values are respectively calculated by the same methods as in a conventional rectifier and inverter. Switching pattern calculators 22 and 24 respectively calculate the switching patterns (ON/OFF commands) of the individual switching elements $S_{1r}$-$S_{6r}$ and $S_1$-$S_6$ constituting the virtual rectifier 100 and the virtual inverter 200, on the basis of the input current command values $i_r^*$, $i_s^*$ and $i_t^*$ and the output voltage command values $v_u^*$, $v_v^*$ and $v_w^*$.

FIG. 10 is a block diagram showing the configuration of the virtual inverter command calculator 23, in which a general V/f constant control is applied. Referring to FIG. 10, when a frequency command f* is inputted, a d-axis voltage command value $v_d^*$ and a q-axis voltage command value $v_q^*$ of a d-q rotating coordinate system are calculated and outputted by V/f constant controller 231. In rotating coordinate transformation block 232, the voltage command values $v_d^*$ and $v_q^*$ are subjected to rotating coordinate transformations by using a phase command θ* that has been obtained by integrating the frequency command f* by phase calculator 233, whereby the three-phase voltage commands $v_u^*$, $v_v^*$ and $v_w^*$ are outputted.

In command synthesizer 25 of FIG. 9, the switching patterns of the virtual rectifier 100 and virtual inverter 200 are synthesized. For example, a state where the switching element $S_{1r}$ within the virtual rectifier 100 and the switching element $S_2$ within the virtual inverter 200 are ON in FIG. 11 is a state where the R-phase on the input side and the V-phase on the output side are connected. This state corresponds to a state in which the bidirectional switch $S_{rv}$ connected between the R- and V-phases is ON in the matrix converter shown in FIG. 8.

The calculations of the following Equation 1 are executed on the basis of such an idea, whereby the switching pattern of the bidirectional switches $S_{ru}$, $S_{su}$, $S_{tu}$, $S_{rv}$, $S_{sv}$, $S_{tv}$, $S_{rw}$, $S_{sw}$ and $S_{tw}$ of the matrix converter can be uniquely obtained from the switching patterns of the respective switching elements $S_{1r}$-$S_{6r}$ and $S_1$-$S_6$ of the virtual rectifier 100 and virtual inverter 200.

$$\begin{bmatrix} S_{ru} & S_{su} & S_{tu} \\ S_{rv} & S_{sv} & S_{tv} \\ S_{rw} & S_{sw} & S_{tw} \end{bmatrix} = \begin{bmatrix} S_{1r}S_1 + S_{4r}S_4 & S_{2r}S_1 + S_{5r}S_4 & S_{3r}S_1 + S_{6r}S_4 \\ S_{1r}S_2 + S_{4r}S_5 & S_{2r}S_2 + S_{5r}S_5 & S_{3r}S_2 + S_{6r}S_5 \\ S_{1r}S_3 + S_{4r}S_6 & S_{2r}S_3 + S_{5r}S_6 & S_{3r}S_3 + S_{6r}S_6 \end{bmatrix}$$

[Equation 1]

The terms $S_{ru}$, $S_{su}$, $S_{tu}$, $S_{rv}$, $S_{sv}$, $S_{tv}$, $S_{rw}$, $S_{sw}$ and $S_{tw}$, and $S_{1r}$-$S_{6r}$ and $S_1$-$S_6$ in Equation 1 indicate the switching functions of the corresponding bidirectional switches and switching elements designated by the same letters, and they become "1's" when the bidirectional switches or switching elements are ON, whereas they become "0's" when OFF. This control scheme can apply directly to the controls of the conventional rectifier and inverter, and is therefore easy to realize. A technique of this type is disclosed by Jun-ichi Itoh et al., Proc. IEEJ-D Society, Vol. 124, No. 5, pp. 457-463, 2004.

Meanwhile, the matrix converter shown in FIG. 8 switches a three-phase AC voltage directly by the bidirectional switches, thereby to output a three-phase AC voltage. Therefore, the range of the voltage that can be outputted by the PWM control (PWM permissible range) lies within the envelope range of six-phase AC as shown in FIG. 12. Accordingly, the range of the output voltage commands with which a desired output voltage is obtainable is 0.866 times a supply voltage at the maximum, as shown as a meshed part in FIG. 12.

Within the range that does not exceed 0.866 times the supply voltage, a distortion of the output voltage does not appear, and a sinusoidal wave can be outputted. However, because such a control for generating a sinusoidal wave output is performed continuously, sometimes it is necessary to raise an output current in order to increase, for example, the capacity of the apparatus, especially in the case of employing a motor as the load. Therefore, it is sometimes required to heighten the utilization factor of the supply voltage and to generate a voltage output in an overmodulation region in which the voltage output exceeds 0.866 times the supply voltage. However, when the voltage outputted from the matrix converter exceeds 0.866 times the supply voltage, the distortion appears in the output voltage as indicated by a bold line in FIG. 12, on account of the restriction of the PWM permissible range. This distortion contains, not only components which are odd-numbered harmonics of an output frequency, but also low frequency components peculiar to the matrix converter that are determined by an input frequency and an output frequency.

When a motor is connected to the matrix converter as the load of the matrix converter, the distortion of the output voltage brings about a pulsation of a torque that causes noise or destroys the motor. In particular, the torque pulsation ascribable to a low frequency component below the input frequency exerts a serious influence.

To overcome the above drawback, a conventional control method permits the motor connected as the load to operate only when it does not give rise to a distortion in an output voltage. In other words, in the overmodulation region where the output voltage exceeds 0.866 times the supply voltage, a magnetic flux is weakened in accordance with the input voltage of a power converter, thereby to suppress the output voltage. This technique is disclosed by Ikuya Sato et al., IEEJ-Semiconductor Power Conversion Society, Paper SPC-04-75, 2004, and by Japanese Patent Laid-Open number 5-260762 (Paragraphs [0010], [0012], and [0014]-[0020], FIG. 1, etc.).

When the prior-art technique disclosed by Ikuya Sato et al. or Japanese Patent Laid-Open number 5-260762 is employed, the distortion of the output voltage of the power converter can be suppressed to control the waveform thereof into a sinusoidal shape. Therefore, it is possible to prevent the nonuniform rotation of the motor and the occurrence of the noise. However, the weakening of the magnetic flux increases a torque current, and the increased torque current increases the loss of the motor that causes an abnormal overheating. Accordingly, the motor requires a larger capacity leaving a safety margin, which raises the cost of a system.

SUMMARY OF THE INVENTION

An object of the invention is to provide a control apparatus for an AC-AC direct converter that can decrease the distortion of the output voltage and the low frequency torque pulsation without weakening the magnetic flux, and can suppress the increase of an output current, even when the output voltage of the AC-AC direct converter is greater than 0.866 times the supply voltage to the AC-AC direct converter.

To accomplish the above object, the invention may be realized by any of the following exemplary embodiments. According to an embodiment of the invention, a control apparatus for an AC-AC direct converter is provided. In the AC-AC direct converter, a multiphase AC voltage is directly converted into a multiphase AC voltage of any desired amplitude and frequency by turning ON/OFF semiconductor switching elements by using at least voltage commands outputted from the control apparatus. The control apparatus includes a calculator for calculating a phase command value of an output voltage of the converter, and a calculator calculating at least one of current components of two orthogonal axes, or an absolute value of an output current vector, by using output currents of the converter. A detector is provided for detecting a pulsation component contained in the at least one of the current components. A calculator is provided for calculating a phase correction magnitude by using the pulsation component. The control apparatus corrects the phase command value by using the phase correction magnitude and provides a corrected phase command value to be used in outputting the voltage commands.

According to another embodiment of the invention, a control apparatus for an AC-AC direct converter is provided. In the AC-AC direct converter, a multiphase AC voltage is directly converted into a multiphase AC voltage of any desired amplitude and frequency by turning ON/OFF semiconductor switching elements using at least voltage commands outputted from the control apparatus. The control apparatus includes a calculator for calculating a phase command value of an output voltage of the converter by using a frequency command of the output voltage of the converter inputted into the control apparatus, and a calculator for calculating at least one of current components of two orthogonal axes, or an absolute value of an output current vector, using output currents of the converter and the phase command value. A detector is provided for detecting a pulsation component contained in the at least one of the current components. A calculator is provided for calculating a frequency correction magnitude by using the pulsation component. The control apparatus corrects the frequency command by using the frequency correction magnitude and provides a corrected frequency command to be used in outputting the voltage commands.

The detector for detecting the pulsation component according to the embodiments of the invention preferably is a high-pass filter.

According to the invention, a pulsation component contained in at least one of the current components of two orthogonal axes or the absolute value of an output current vector is detected, and the phase or frequency of an output voltage is corrected on the basis of the detected signal, thereby to decrease the distortion of the low frequency output voltage when the output voltage from the direct converter exceeds 0.866 times the supply voltage. Especially in the case of driving a motor by the direct converter, a voltage greater than 0.866 times the supply voltage can be outputted without giving rise to low frequency torque pulsation, and hence, the increase of an output current can be suppressed by enhancing a voltage transfer ratio which is the ratio of the output voltage to the input voltage. As a result, there is no need to employ a motor whose capacity leaves a safety margin, and a power conversion system employing the AC-AC direct converter can be realized inexpensively.

BRIEF DESCRIPTION OF THE DRAWINGS

These and other aspects of the invention may better be understood from the following detailed description of preferred embodiments with reference to the accompanying drawings in which.

DESCRIPTION OF THE PREFERRED EMBODIMENTS

Now, embodiments of the invention will be described in conjunction with the drawings. The embodiments to be described below are control apparatuses each of which generates a switching pattern of individual switching elements by synthesizing respective switching patterns for a virtual rectifier and a virtual inverter. The control apparatuses to be described below correspond to the control apparatus for a matrix converter shown in FIG. 9.

Figure 1:
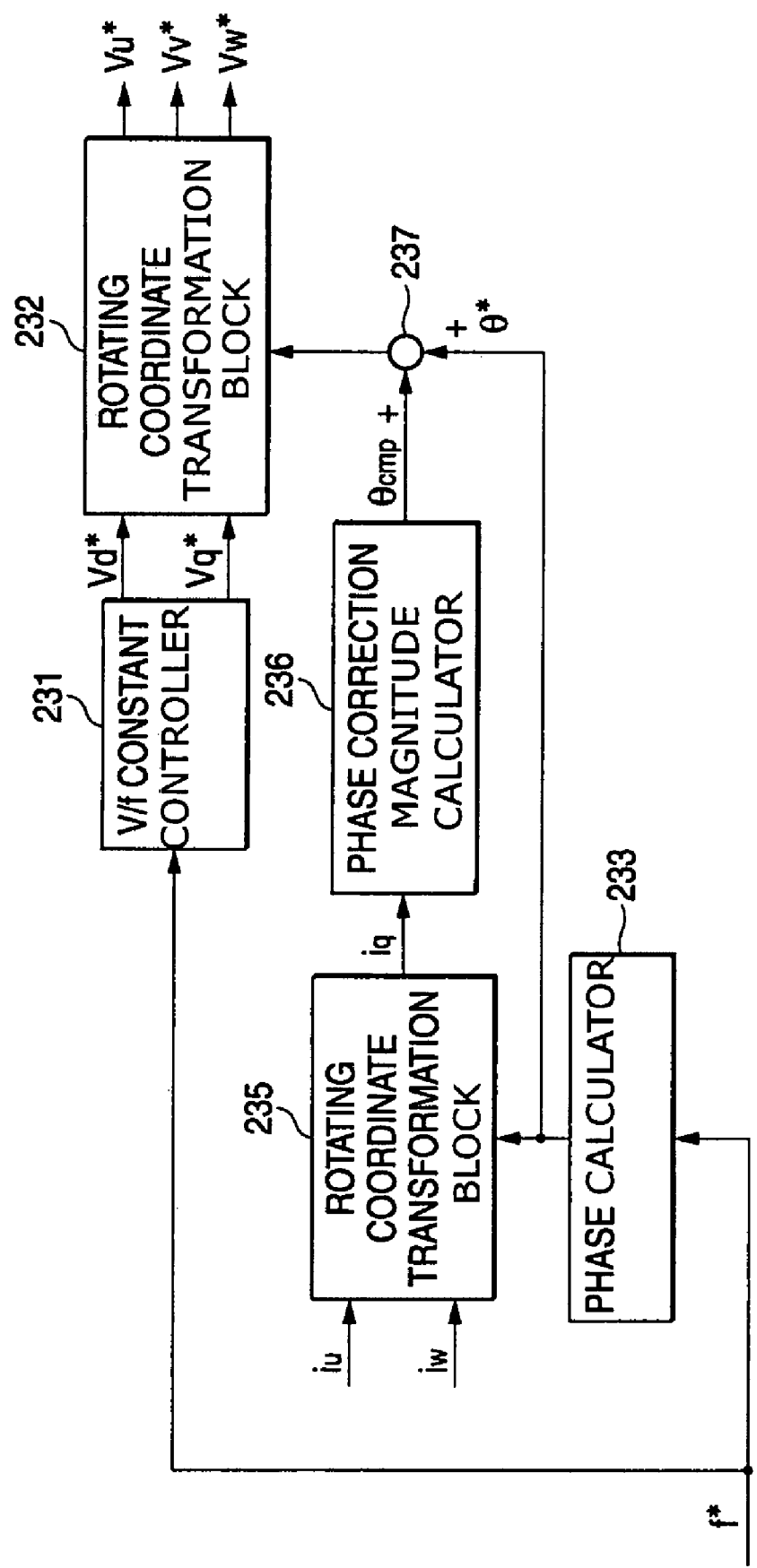
FIG. 1 is a block diagram showing principal portions of a first embodiment of the invention.
Figure 9:
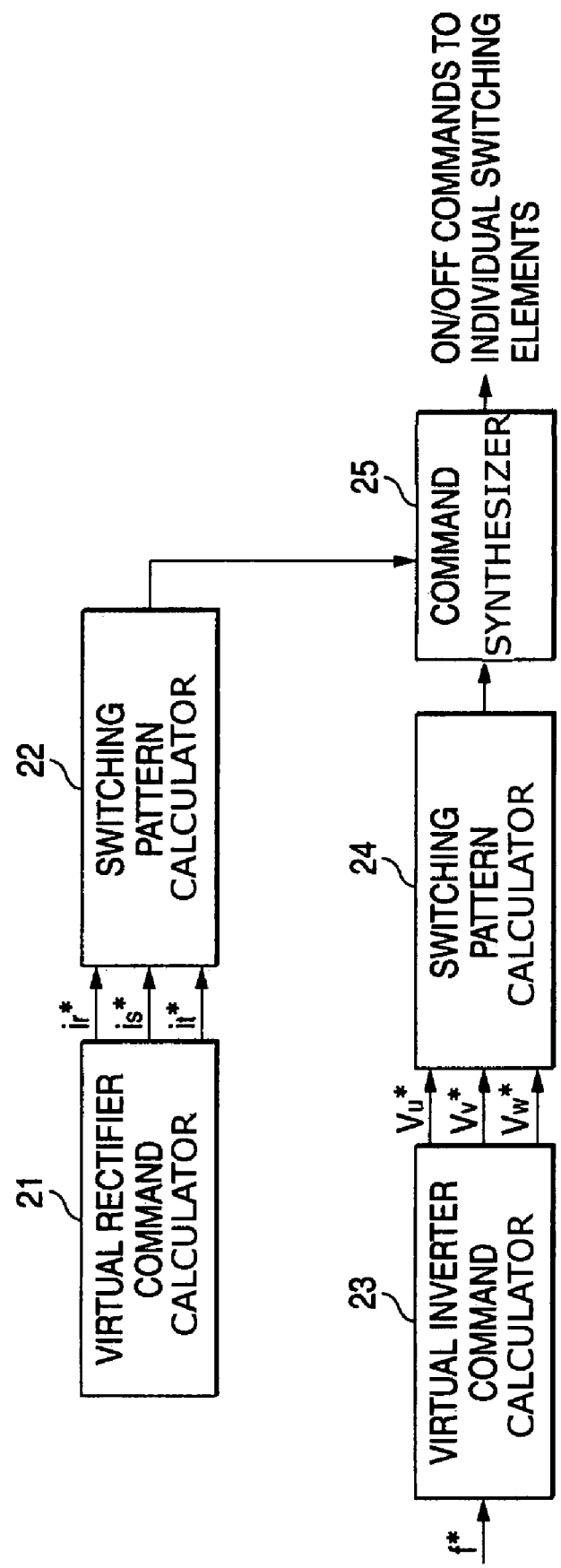
FIG. 9 is a block diagram of a prior-art control apparatus for the matrix converter in FIG. 8.

FIG. 1 shows a first embodiment of the invention, which includes improvements in the internal configuration of the virtual inverter command calculator 23 in FIG. 9. Here, the same elements as those in FIG. 10 shall be designated by the same reference characters.

Figure 10:
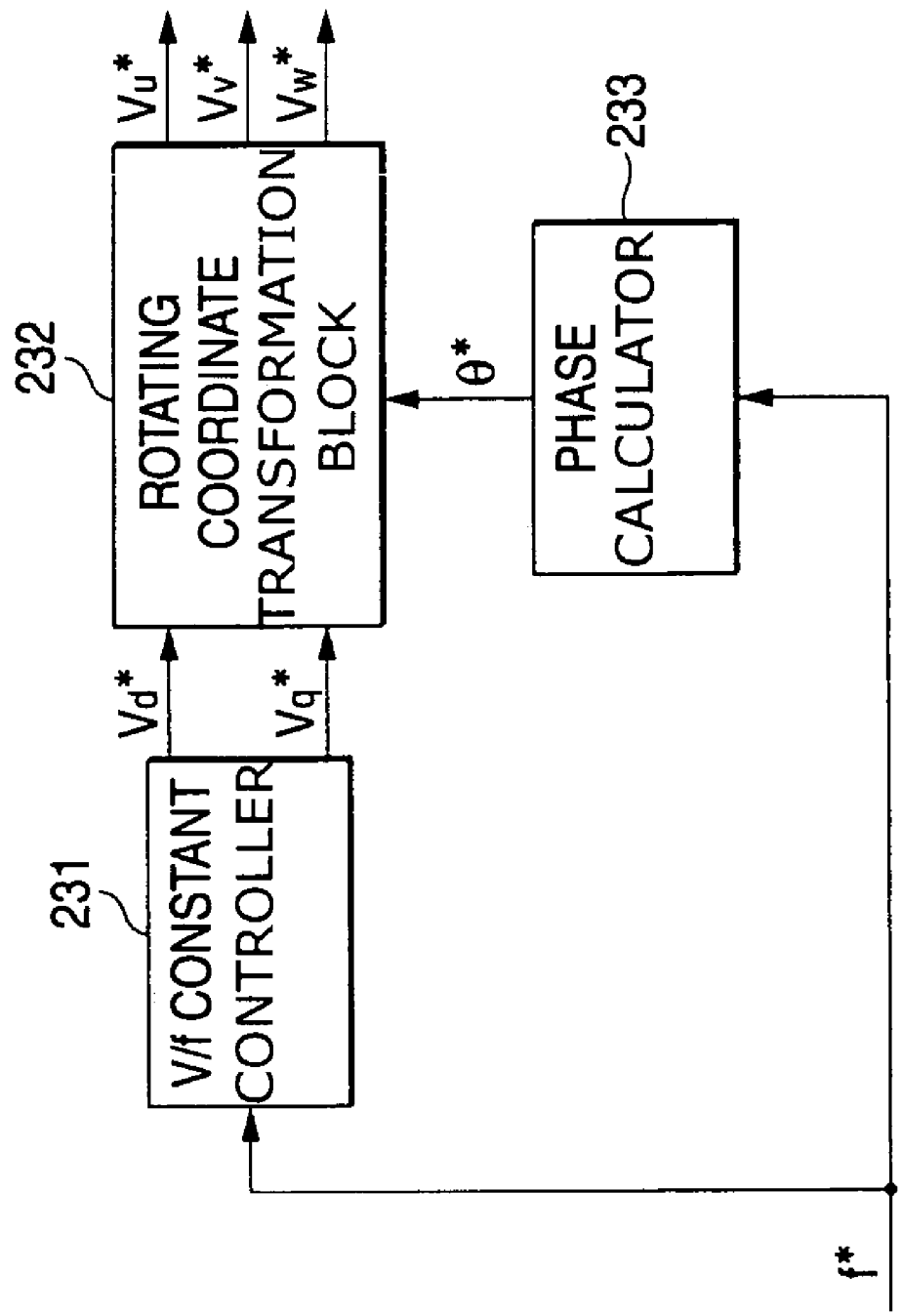
FIG. 10 is a block diagram showing the configuration of the virtual inverter command calculator in FIG. 9.
Figure 11:
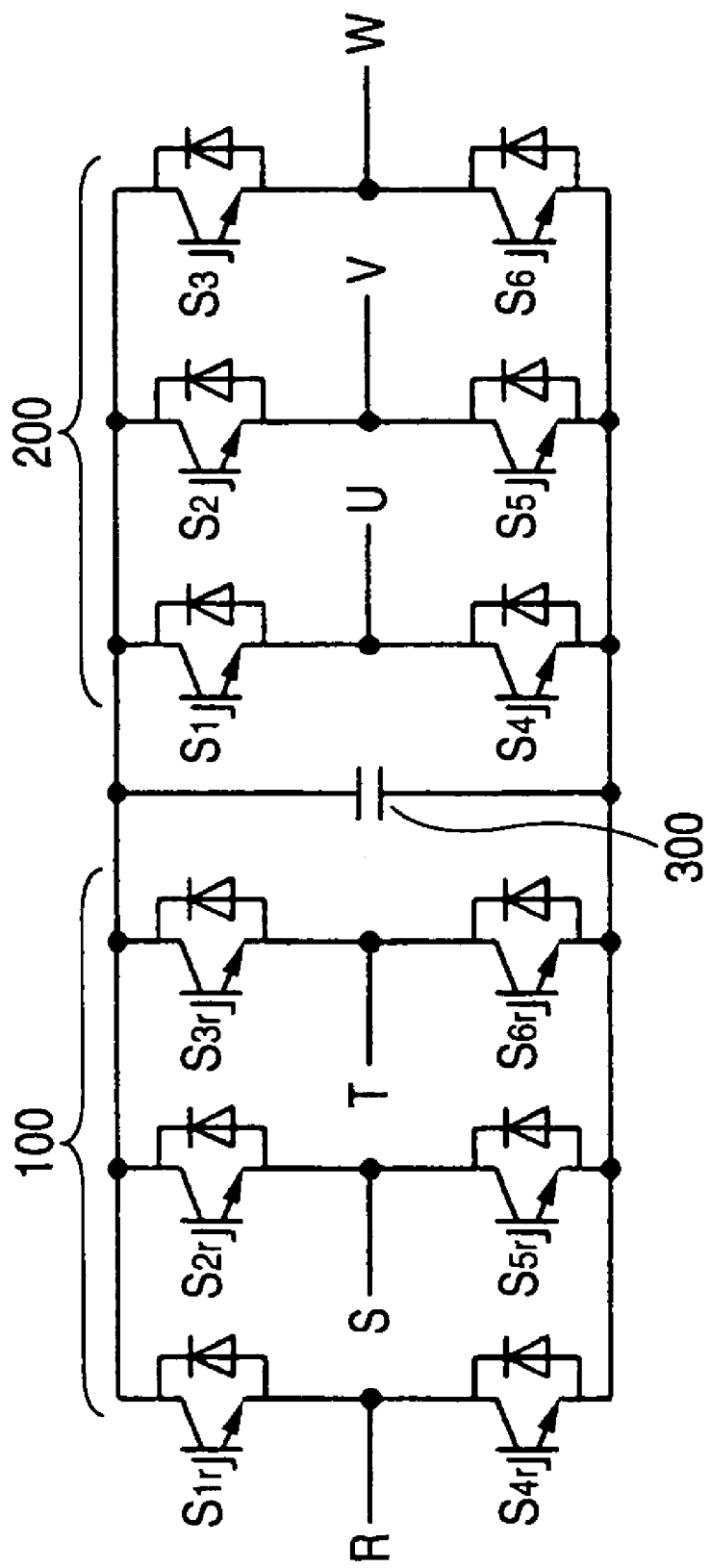
FIG. 11 is a diagram showing the configuration of a virtual rectifier/inverter system.

Referring to FIG. 1, a d-axis voltage command value $v_d^*$ and a q-axis voltage command value $v_q^*$ are calculated from a frequency command f*, as similarly shown in FIG. 10. Output phase currents $i_u$ and $i_v$ detected from a direct converter, e.g., a matrix converter, and a phase command $\theta^*$ outputted from the phase calculator 233, are inputted to rotating coordinate transformation block 235 that calculates a q-axis current $i_q$ that is one of two currents components of two orthogonal axis. Also in phase correction magnitude calculator 236, a pulsation component is detected from the q-axis current $i_q$, so as to obtain a correction magnitude $\theta_{cmp}$ for correcting the phase command $\theta^*$ of an output voltage. The correction magnitude $\theta_{cmp}$ is added to the phase command $\theta^*$ in adder 237, and a corrected phase command $(\theta^*+\theta_{cmp})$ obtained by the addition is given to the rotating coordinate transformation block 232. Then, the rotating coordinate transformation block 232 transforms the d-axis voltage command $v_d^*$ and the q-axis voltage command $v_q^*$ into the three-phase voltage commands $v_u^*$, $v_v^*$ and $v_w^*$ by using the corrected phase command.

Figure 2:
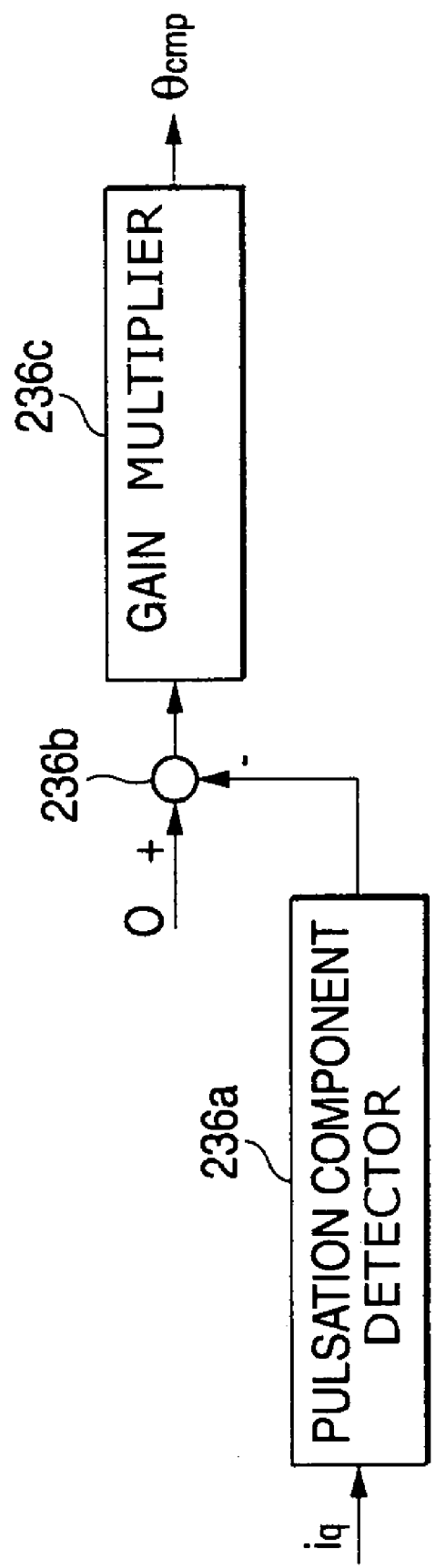
FIG. 2 is a block diagram showing the configuration of the phase correction magnitude calculator in FIG. 1.

FIG. 2 is a block diagram showing the configuration of the phase correction magnitude calculator 236 of FIG. 1. The q-axis current $i_q$ is inputted to pulsation component detector 236a that detects only the low frequency pulsation component. The configuration of the pulsation component detector 236a is, for example, referred to as a band-pass filter. The detected pulsation component is subtracted from zero, i.e., a target value, by adder/subtractor 236b. Then, multiplier 236c multiplies the resulting deviation by a predetermined gain, so as to obtain the phase correction magnitude $\theta_{cmp}$ which eliminates the pulsation component of the q-axis current $i_q$. According to the above configuration, a feedback loop as to the pulsation component of the q-axis current $i_q$ is formed. In addition, the rotating coordinate transformation block 232 generates the three-phase voltage commands $v_u^*$, $v_v^*$ and $v_w^*$ by using the corrected phase command $(\theta^*+\theta_{cmp})$. The above configuration thus can decrease the pulsation current of the output current of the direct converter.

Accordingly, even when the output voltage exceeds 0.866 times the supply voltage, the distortion of the output voltage can be decreased. Especially, the low frequency output distortion peculiar to the AC-AC direct converter can be decreased. Another advantage is that, in the case of driving a motor by the converter, low frequency torque pulsation can be avoided.

Figure 3:
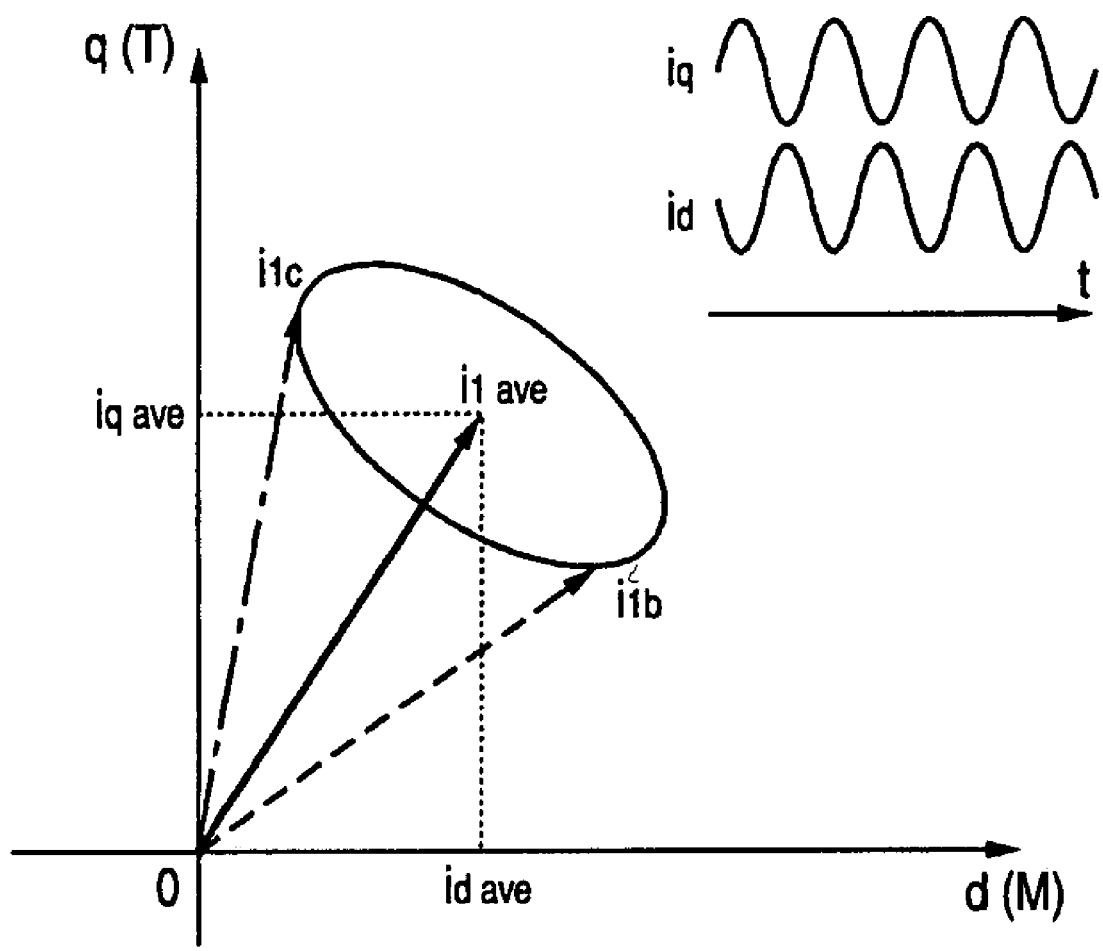
FIG. 3 is a diagram showing the behavior of output current vectors in an overmodulation region in the prior art.
Figure 12:
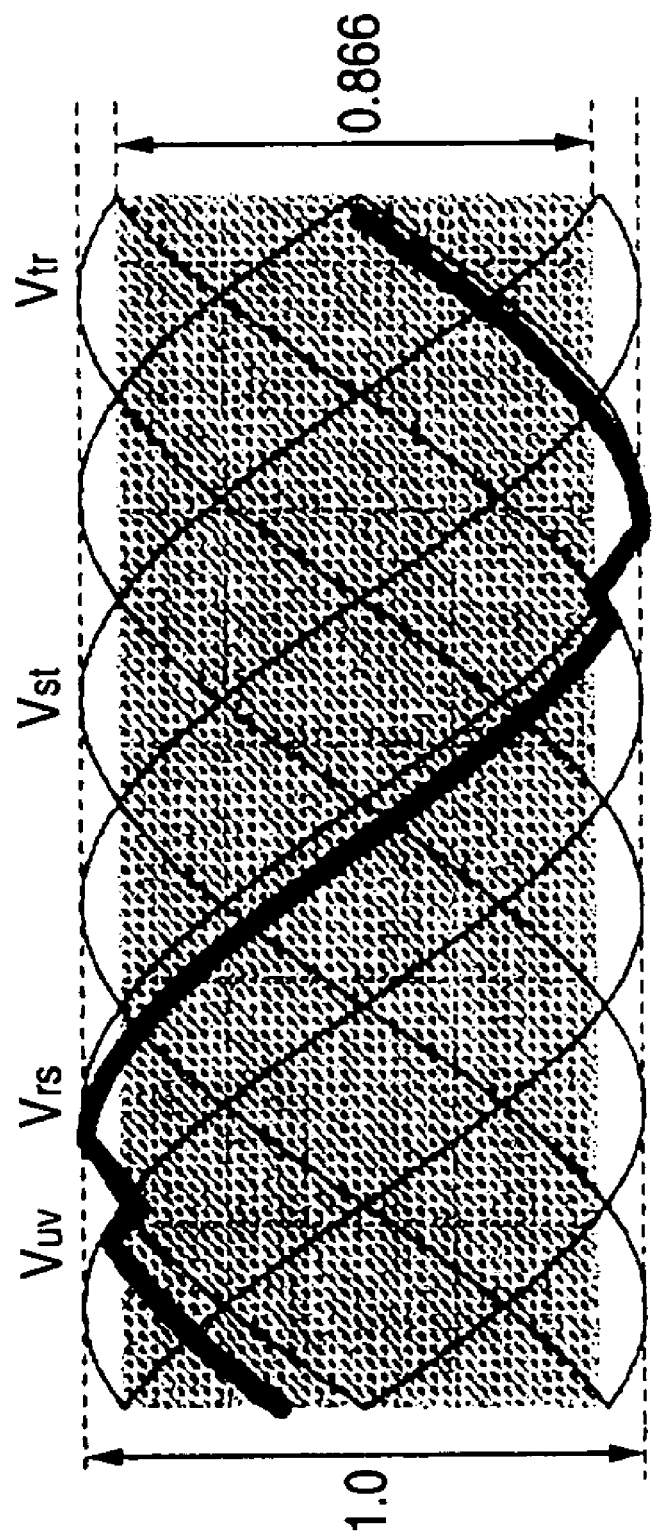
FIG. 12 is a waveform diagram of an output voltage of the matrix converter having the control apparatus of FIG. 9 in an overmodulation mode.

Next, the operation and advantages of this embodiment will be described with reference to vector diagrams. FIG. 3 shows the behavior of the output current vector of the converter in an overmodulation region in the prior art disclosed, for example, by the previously mentioned Jun-ichi Itoh et al. publication. Assuming that a secondary magnetic flux axis (M-axis) of the motor that is the load of the converter, and a d-axis in a rotating coordinate system in the control apparatus are always in agreement, the current vector is constant if the torque is constant, in a modulation region (the region where the output voltage does not exceed 0.866 times the supply voltage, shown as the meshed part in FIG. 12).

In the overmodulation region, however, the output current vector (shown as $i_{1b}$ or $i_{1c}$) pulsates, and hence, the locus thereof depicts an elliptic trajectory, shown in FIG. 3. As previously noted, in the operation of this embodiment, the phase command of the output voltage of the direct converter is corrected, whereby the pulsation component of the q-axis current $i_q$ is decreased so as to bring the magnitude of the q-axis current $i_q$ close to an average value $i_{q\,ave}$. In FIG. 3, "$i_{1\,ave}$" indicates the average value of the output current vector, which is the vector sum of the average value $i_{d\,ave}$ of the d-axis current $i_d$ and the average value $i_{q\,ave}$ of the q-axis current $i_q$.

Figure 4A:
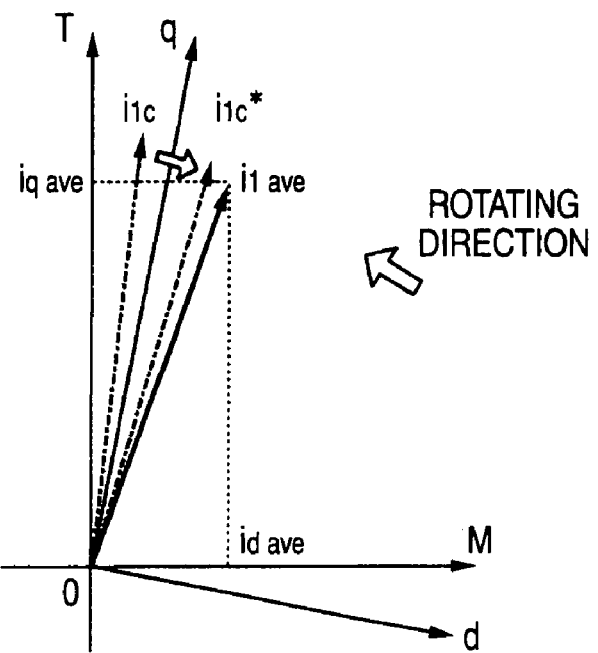
FIGS. 4A and 4B are diagrams showing behaviors of output current vectors in the first embodiment of the invention.

On the other hand, FIG. 4A shows the behavior of the output current vector according to the invention in a case where the q-axis current $i_q$ is larger than the average value $i_{q\,ave}$. Here, the output current vector before the correction of the phase command of the output voltage is assumed to be $i_{1c}$. When $i_q$ is greater than $i_{q\,ave}$ as shown in FIG. 4A, the phase correction magnitude calculator 236 shown in FIGS. 1 and 2 calculates and outputs the correction magnitude $\theta_{cmp}$ which decreases the phase command $\theta^*$. Owing to this manipulation, the d-axis, having been in agreement with the M-axis, comes to lag relative to the M-axis, so that the output current vector $i_{1c}$ rotates in a direction opposite to the rotating direction of the rotating coordinates, and the vector $i_{1c}$ changes into $i_{1c}^*$.

Figure 4B:
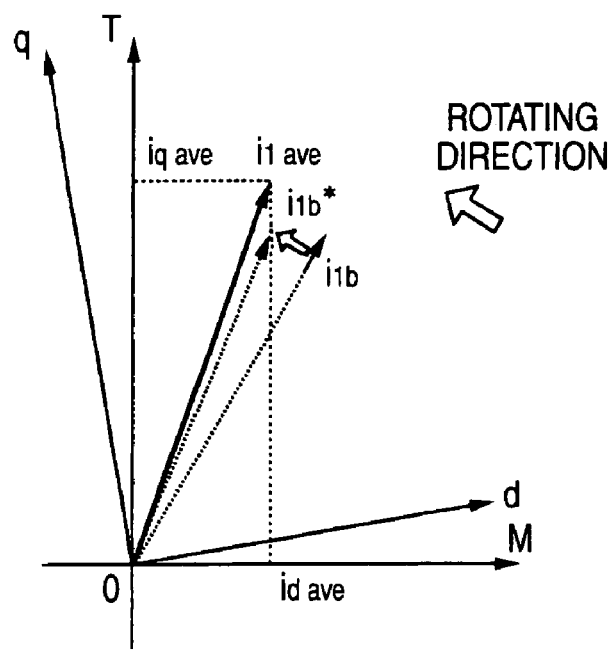

In a case where the output current vector is $i_{1b}$ as shown in FIG. 4B and where the q-axis current $i_q$ is smaller than the average value $i_{q\,ave}$, the phase correction magnitude calculator 236 calculates and outputs the correction value $\theta_{cmp}$, which increases the phase command $\theta^*$. Owing to this manipulation, the d-axis, having been in agreement with the M-axis, comes to lead relative to the M-axis, so that the output current vector $i_{1b}$ rotates in the same direction as the that of the rotating coordinates, and the vector $i_{1b}$ changes into $i_{1b}^*$.

As described above, according to this embodiment, the phase command $\theta^*$ is corrected so that the q-axis current $i_q$ may come close to the average value $i_{q\,ave}$, and hence, the pulsation component of the q-axis current $i_q$ (i.e., the torque pulsation) can be suppressed. Although this embodiment has been described as to the case where the V/f constant control is applied to the control of the output voltage, a vector control also is applicable to the control of the output voltage.

The d-axis current $i_d$ or the absolute value $(=\sqrt{(i_d^2+i_q^2)})$ of the output current vector also contains a component that has the same frequency as the pulsation component of the q-axis current $i_q$. Therefore, the phase correction magnitude $\theta_{cmp}$ can be calculated also by using the quantity $i_d$ or $\sqrt{(i_d^2+i_q^2)}$.

Figure 5:
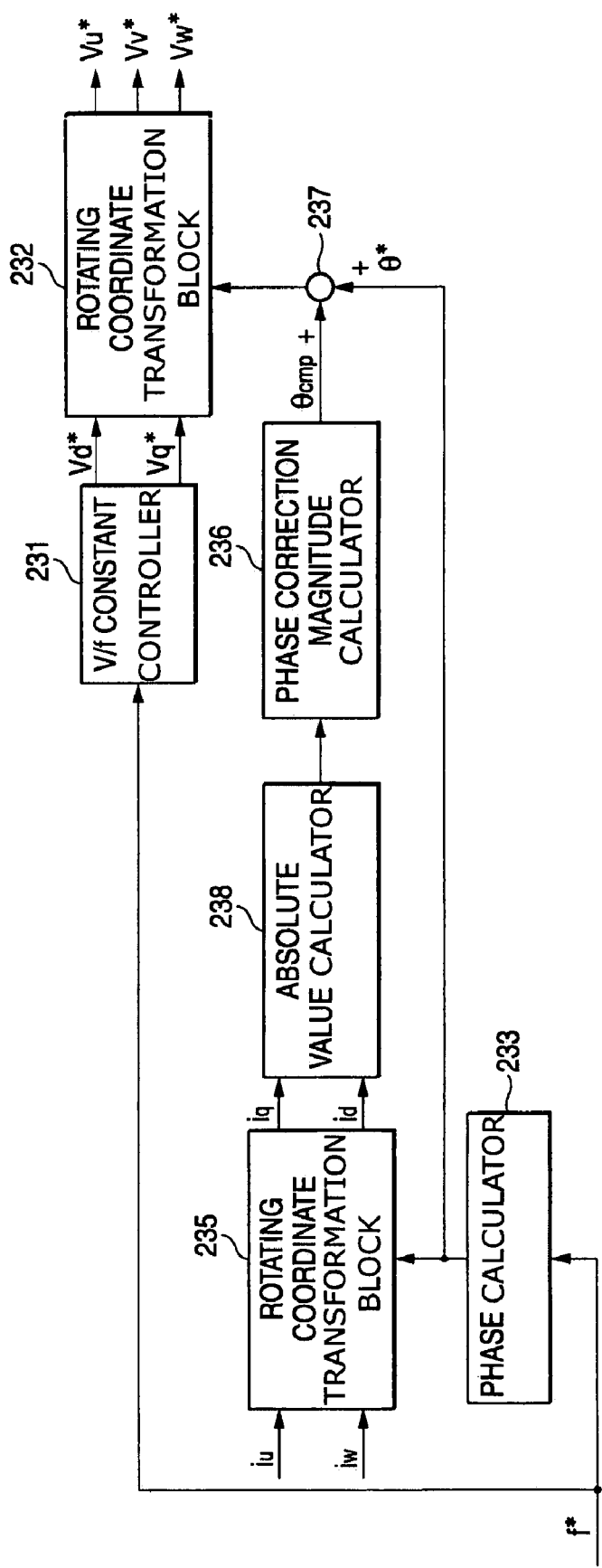
FIG. 5 is a block diagram showing principal portions of a second embodiment of the invention.

FIG. 5 is a block diagram showing a second embodiment of the invention in which a phase correction magnitude $\theta_{cmp}$ is calculated by using the absolute value of an output current vector. Absolute value calculator 238 calculates the absolute value ($=\sqrt{(i_d^2+i_q^2)}$) of the output current vector using the currents $i_d$ and $i_q$ outputted from rotating coordinate transformation block 235. Phase correction magnitude calculator 236 calculates the phase correction magnitude $\theta_{cmp}$ using the absolute value.

Figure 6:
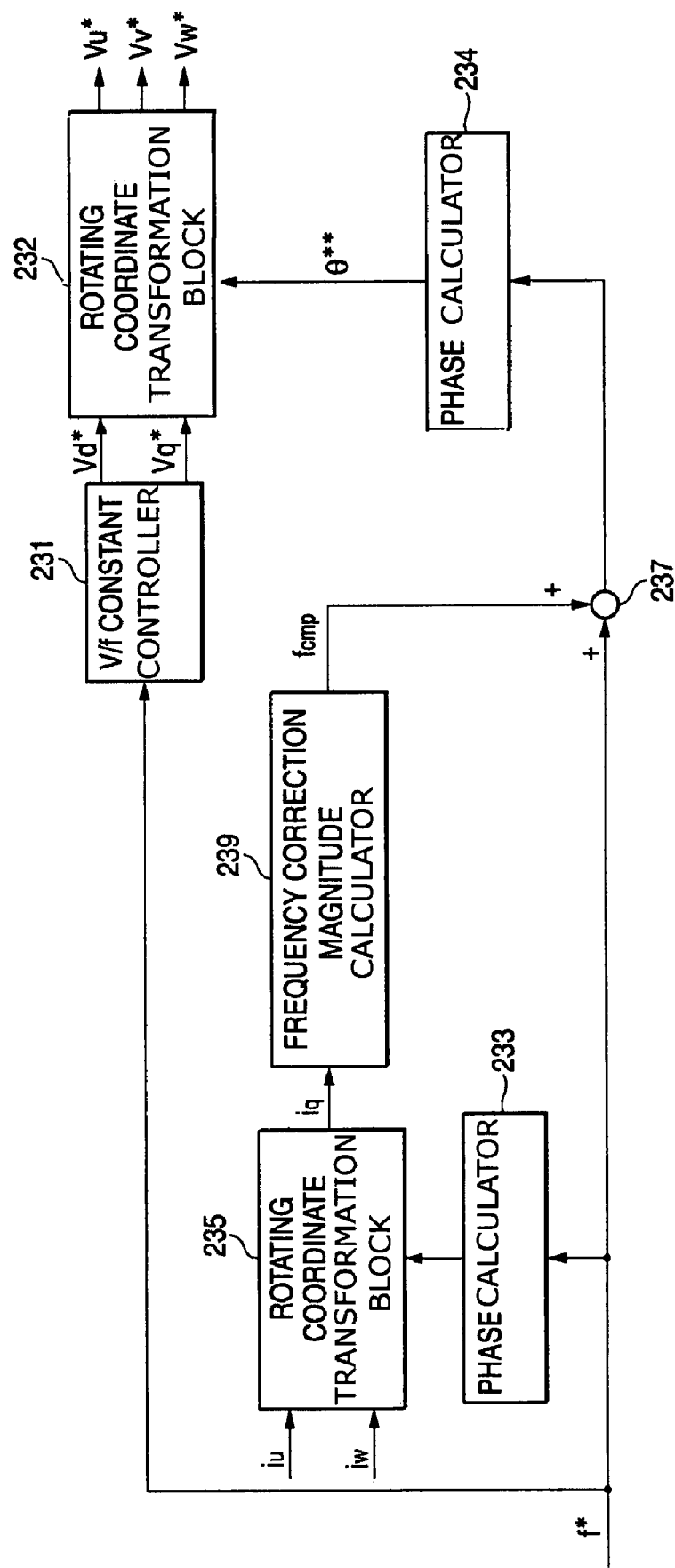
FIG. 6 is a block diagram showing principal portions of a third embodiment of the invention.

Next, FIG. 6 is a block diagram showing principal portions of a third embodiment of the invention. The embodiment of FIG. 6 is different from that of FIG. 1 in that a frequency correction magnitude $f_{cmp}$ calculated from the pulsation component of a q-axis current $i_q$ by frequency correction magnitude calculator 239 is added to the frequency command f* of the output voltage by adder/subtractor 237. The frequency correction magnitude calculator 239 can be realized by the same configuration as shown in FIG. 2. The calculator 239 outputs the correction magnitude $f_{cmp}$ for correcting the frequency command f* on the basis of the pulsation component of the q-axis current $i_q$. The adder/subtractor 237 provides a corrected output voltage frequency command (f*+$f_{cmp}$) by adding the correction magnitude $f_{cmp}$ to the frequency command f*. The corrected frequency command is inputted to phase calculator 234, which obtains the final phase command $\theta$ of the output voltage by using the corrected frequency command. Then, rotating coordinate transformation block 232 transforms the rotating coordinates by using the phase command $\theta$, and outputs three-phase voltage commands $v_u^*$, $v_v^*$ and $v_w^*$.

Although the frequency of the output voltage of the direct converter is manipulated in this embodiment, this is equivalent to the manipulation of the phase of the output voltage, and the same advantages as in the first and second embodiments can be attained. The d-axis current $i_d$ or the absolute value ($=\sqrt{(i_d^2+i_q^2)}$) of the output current vector can be used for the calculation of the frequency correction magnitude $f_{cmp}$ as well, similarly to the above.

For the purpose of attaining the greatest advantages of the invention, it is important precisely to detect only the low frequency pulsation component of the q-axis current, the d-axis current or the output-current-vector absolute value. For a precise detection, it is required of the phase correction magnitude calculators 236 in FIGS. 1 and 5 or the frequency correction magnitude calculator 239 in FIG. 6 that a detection delay is not involved in the filter for detecting the pulsation component of the input signal, and that components other than the pulsation component to-be-detected can be completely removed.

As stated before, the band-pass filter is suitable for achieving the above purpose. Since, however, the frequency of the pulsation component changes depending upon the frequencies of the input and output, a band-pass filter having different pass bands in accordance with conditions is necessitated. Such a band-pass filter whose pass band changes in accordance with the output frequency becomes very complicated in structure and is hard to realize. A fourth embodiment to be explained below makes improvements in this respect.

Figure 7:
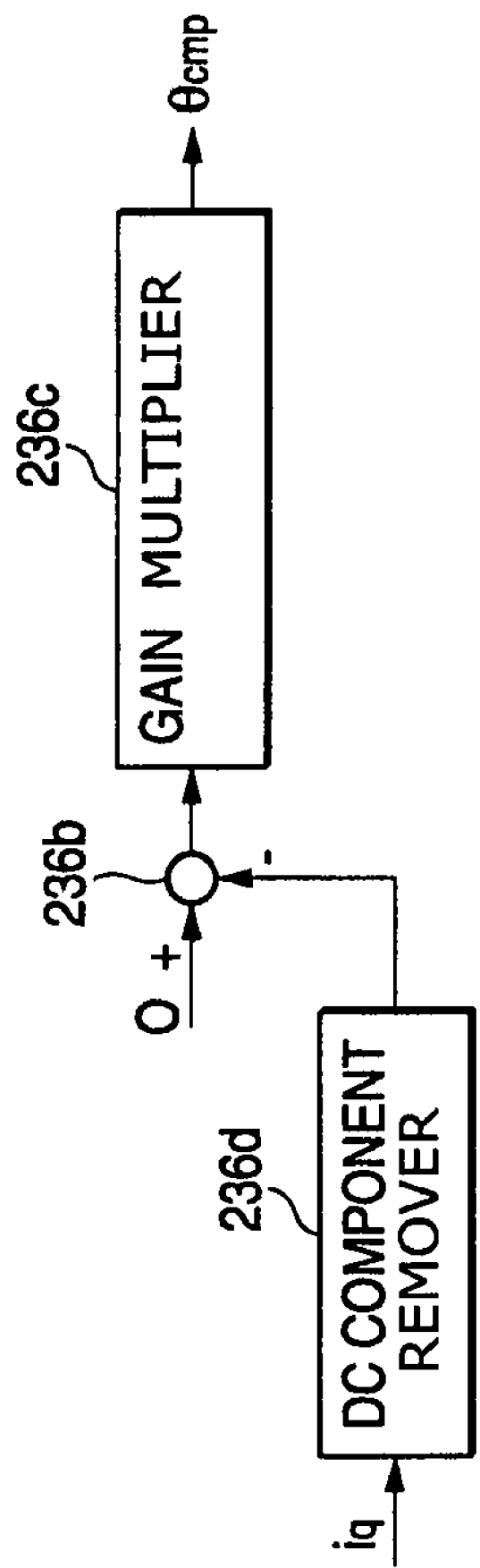
FIG. 7 is a block diagram showing principal portions of a fourth embodiment of the invention.
Figure 8:
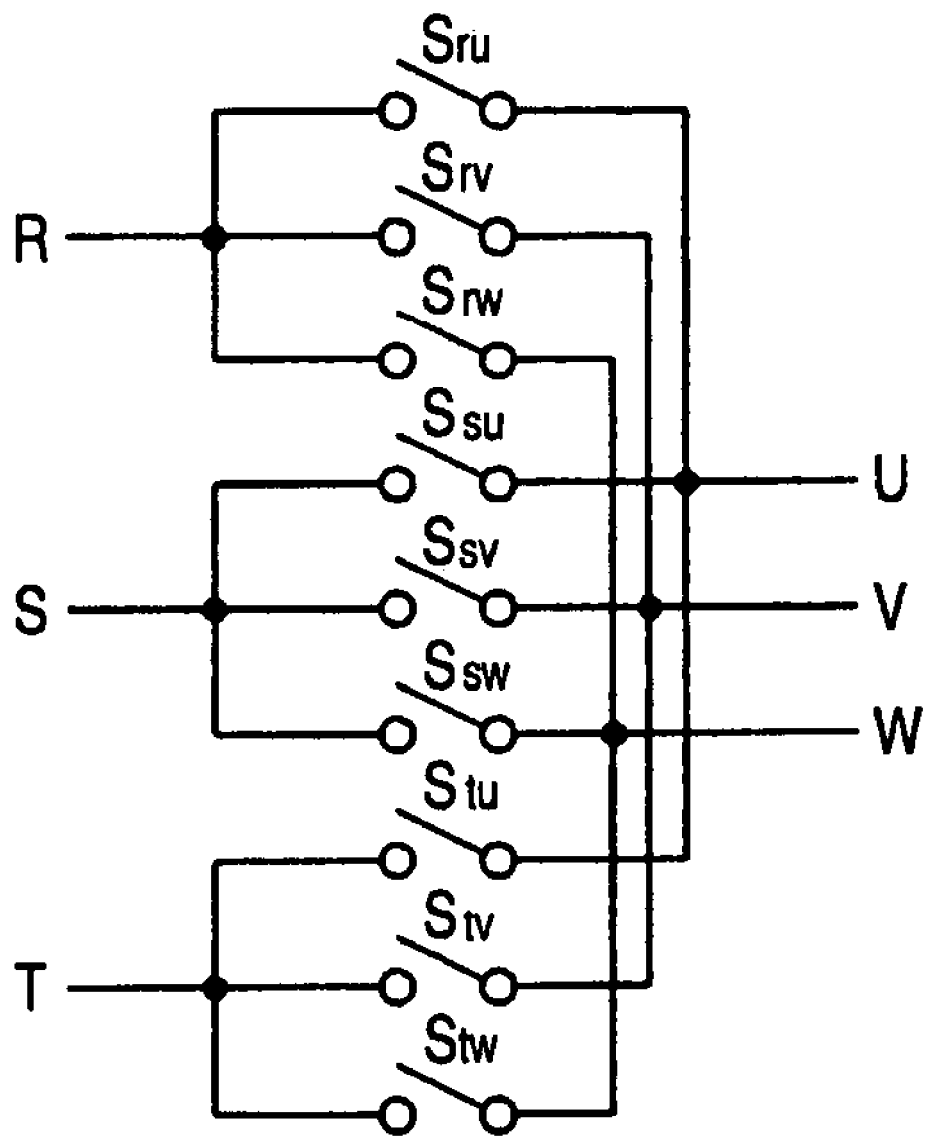
FIG. 8 is a diagram showing the configuration of the main circuit of a matrix converter.

FIG. 7 is a block diagram showing principal portions of the fourth embodiment of the invention. Although this embodiment will be described as to the case of detecting the pulsation component of the q-axis current $i_q$, the embodiment is not restricted to the detection of the q-axis current $i_q$. The embodiment is also applicable to the case of detecting the pulsation component of the d-axis current or the absolute value of the output current vector. Referring to FIG. 7, DC component remover 236d removes only a DC component of the q-axis current $i_q$, and it is realizable by, for example, a high-pass filter. The phase correction magnitude $\theta_{cmp}$ or the frequency correction magnitude $f_{cmp}$ is calculated from a signal with only the DC component removed, by the same method as in FIG. 2.

When the cutoff frequency of the high-pass filter is set at a very low frequency, the influence of the detection delay ascribable to the filter on the low frequency component that is to be decreased is negligible, and hence, it is possible to decrease the torque pulsation. On the other hand, in the overmodulation region, the q-axis current $i_q$ contains, not only the low frequency component peculiar to the matrix converter, but also high frequency components ascribable to the fifth-order components of the output frequency, the seventh-order components of the output frequency, and so on. Therefore, in the case where the high-pass filter is employed as the DC component remover 236d, components other than the peculiar low frequency component also are detected. The cutoff frequency of the high-pass filter thus need not be altered in accordance with the running conditions. Accordingly, unlike the band-pass filter, such a high-pass filter easily can be realized.

What is claimed is:

1. A control apparatus for an AC-AC direct converter in which a multiphase AC voltage is directly converted into a multiphase AC voltage having a desired amplitude and frequency by turning semiconductor switching elements ON/OFF in response to at least voltage commands outputted from the control apparatus, comprising:
   a first means for calculating a phase command value of an output voltage of the converter;
   a second means for calculating at least one of two current components of two orthogonal axes by using output currents of the converter and the phase command value calculated by the first means;
   a third means for detecting a pulsation component contained in the at least one of two current components;
   a fourth means for calculating a phase correction magnitude by using the pulsation component so as to decrease the pulsation component;
   fifth means for correcting the phase command value by using the phase correction magnitude to provide a corrected phase command value; and
   a rotating coordinate transformation means that outputs the voltage commands, the rotating coordinate transformation means receiving the corrected phase command value.

2. The control apparatus of claim 1, wherein the third means comprises a filter.

3. The control apparatus of claim 1, wherein the fifth means comprises an addition means that corrects the phase command value by adding the phase correction magnitude to the phase command value.

4. The control apparatus of claim 1, wherein the fourth means includes:
   an addition/subtraction means for subtracting the detected pulsation component from zero, thereby to provide a subtracted result; and
   a multiplication means for multiplying the subtracted result by a predetermined gain, thereby to provide the phase correction magnitude.

5. A control apparatus for an AC-AC direct converter in which a multiphase AC voltage is directly converted into a multiphase AC voltage having a desired amplitude and frequency by turning semiconductor switching elements ON/OFF by using at least voltage commands outputted from the control apparatus, comprising:

a first means for calculating a phase command value of an output voltage of the converter;

a second means for calculating two current components of two orthogonal axes by using output currents of the converter and the phase command value calculated by the first means, and for calculating an absolute value of an output current vector by using the two current components;

a third means for detecting a pulsation component contained in the absolute value;

a fourth means for calculating a phase correction magnitude by using the pulsation component so as to decrease the pulsation component;

fifth means for combining the phase command value and the phase correction magnitude to provide a corrected phase command value; and a rotating coordinate transformation means that outputs the voltage commands, the rotating coordinate transformation means receiving the corrected phase command value.

6. The control apparatus of claim 5, wherein the third means comprises a filter.

7. The control apparatus of claim 5, wherein the fifth means comprises an addition means that corrects the phase command value by adding the phase correction magnitude to the phase command value.

8. The control apparatus of claim 5, wherein the fourth means includes:

an addition/subtraction means for subtracting the detected pulsation component from zero, thereby to provide a subtracted result; and a multiplication means for multiplying the subtracted result by a predetermined gain, thereby to provide the phase correction magnitude.

9. A control apparatus for an AC-AC direct converter in which a multiphase AC voltage is directly converted into a multiphase AC voltage having a desired amplitude and frequency by turning semiconductor switching elements ON/OFF by using at least voltage commands outputted from the control apparatus, comprising:

a first means for calculating a phase command value of an output voltage of the converter by using a frequency command of the output voltage of the converter inputted into the control apparatus;

a second means for calculating at least one of two current components of two orthogonal axes by using output currents of the converter and the phase command value calculated by the first means;

a third means for detecting a pulsation component contained in the at least one of two current components;

a fourth means for calculating a frequency correction magnitude by using the pulsation component so as to decrease the pulsation components;

fifth means for correcting the frequency command by using the frequency correction magnitude to provide a corrected frequency command;

a phase calculation means that calculates a final phase command value of the output voltage by using the corrected frequency command; and a rotating coordinate transformation means that outputs the voltage commands, the rotating coordinate transformation receiving the final phase command value.

10. The control apparatus of claim 9, wherein the third means comprises a filter.

11. The control apparatus of claim 9, wherein the fifth means comprises an addition means that corrects the frequency command by adding the frequency correction magnitude to the frequency command.

12. The control apparatus of claim 9, wherein the fourth means includes:

an addition/subtraction means for subtracting the detected pulsation component from zero, thereby to provide a subtracted result; and a multiplication means for multiplying the subtracted result by a predetermined gain, thereby to provide the frequency correction magnitude.

13. The control apparatus of claim 9, wherein:

the second means calculates two current components of two orthogonal axes and further calculates an absolute value of an output current vector by using the two current components;

the third means detects a pulsation component contained in the absolute value; and the fourth means calculates a phase correction magnitude by using the pulsation component contained in the absolute value so as to decrease the pulsation component.

14. The control apparatus of claim 13, wherein the third means comprises a filter.

15. The control apparatus of claim 13, wherein the fifth means comprises an addition means that corrects the frequency command by adding the frequency correction magnitude to the frequency command.

16. The control apparatus of claim 13, wherein the fourth means includes:

an addition/subtraction means for subtracting the detected pulsation component from zero, thereby to provide a subtracted result; and a multiplication means for multiplying the subtracted result by a predetermined gain, thereby to provide the frequency correction magnitude.

17. The control apparatus of claim 1, wherein the pulsation component is a low frequency component that has a frequency lower than the frequency of the multiphase AC voltage that is input to the converter.

18. The control apparatus of claim 1, wherein the pulsation component exists only when the magnitude of the multiphase AC voltage that is output from the converter exceeds about 0.866 times the magnitude of the multiphase AC voltage that is input to the converter.

19. The control apparatus of claim 1, wherein said at least one of two current components has a magnitude with an average value, and wherein the phase correction magnitude brings the magnitude of said at least one of two current components closer to an average value thereof.

* * * * *